March 24, 1925.

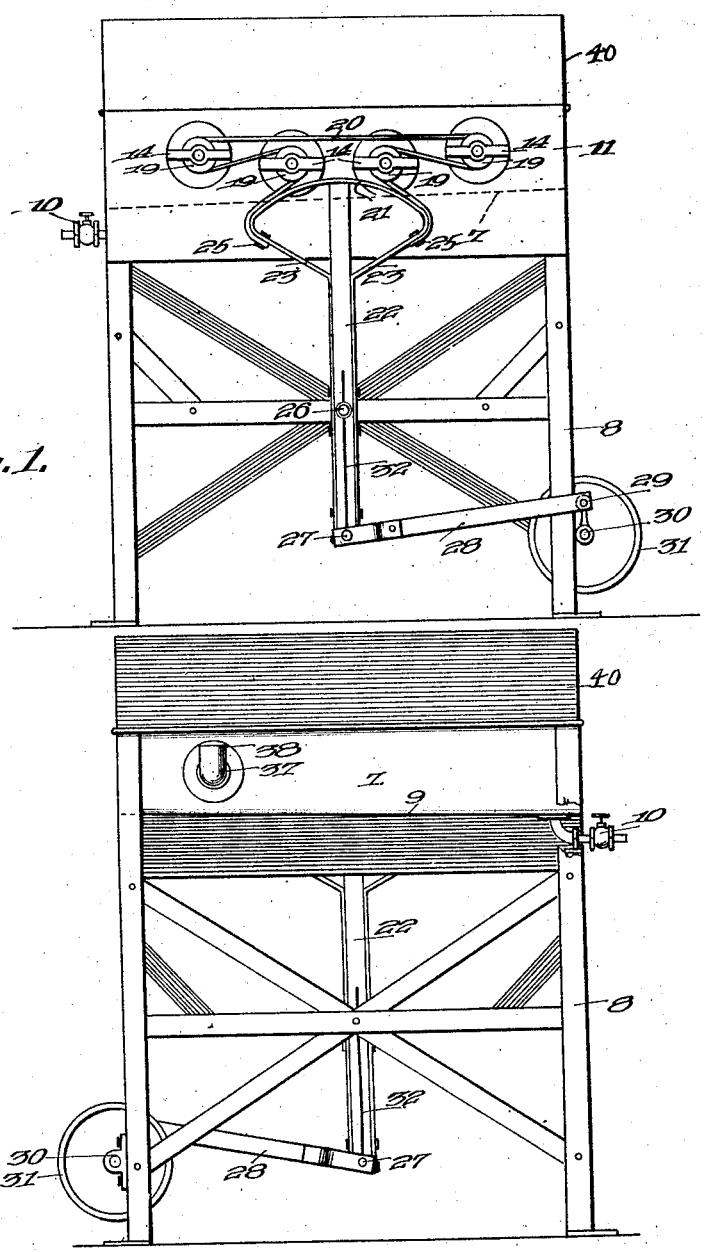

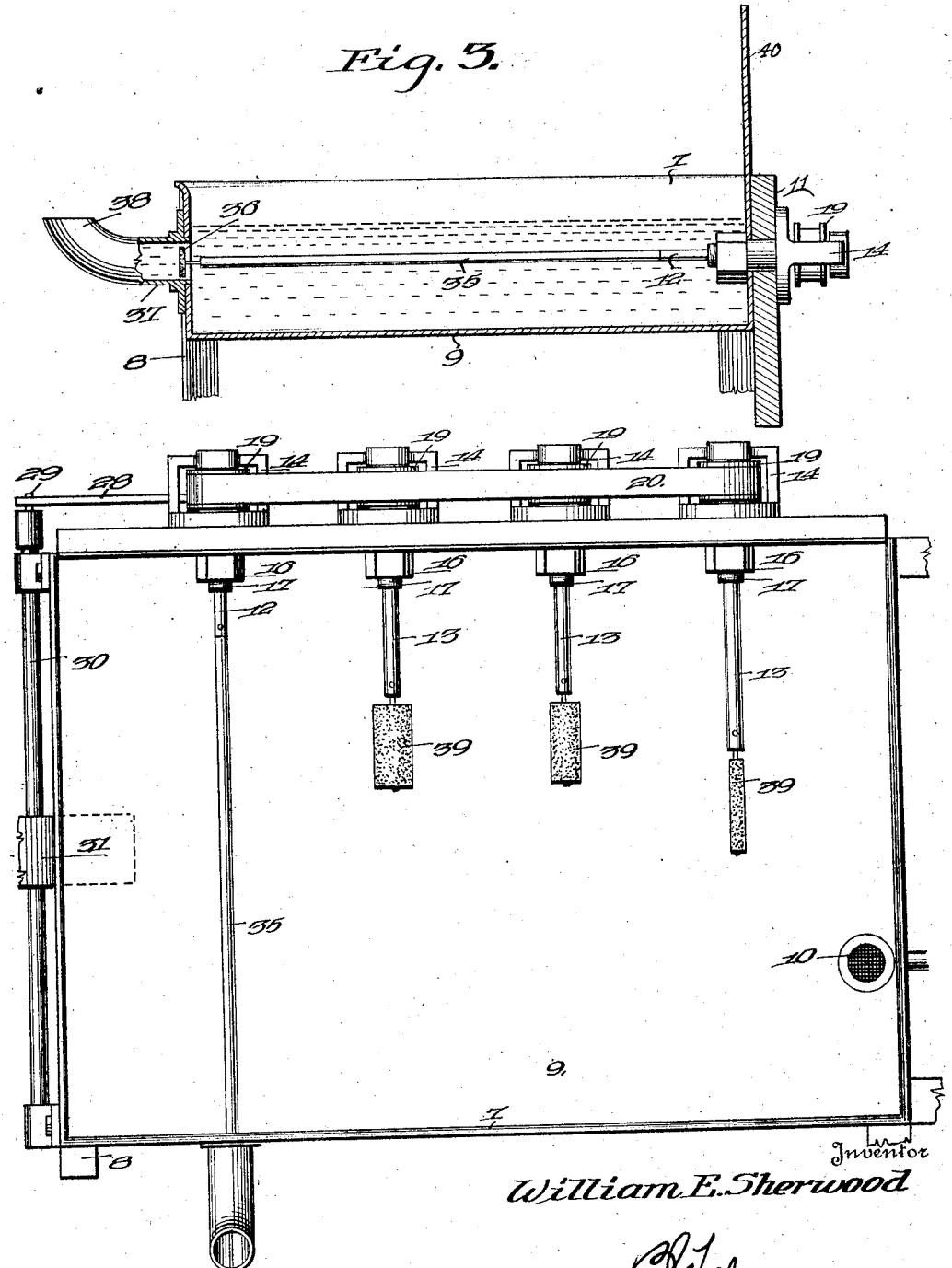

W. E. SHERWOOD

WASHING APPARATUS FOR MILKING MACHINE PARTS

Filed Nov. 9, 1921  3 Sheets-Sheet 3

Inventor
William E. Sherwood

By
Attorney

Patented Mar. 24, 1925.

1,530,859

UNITED STATES PATENT OFFICE.

WILLIAM E. SHERWOOD, OF CANASTOTA, NEW YORK, ASSIGNOR TO CHENANGO EQUIPMENT MFG. CO., OF NORWICH, NEW YORK, A CORPORATION OF NEW YORK.

WASHING APPARATUS FOR MILKING-MACHINE PARTS.

Application filed November 9, 1921. Serial No. 514,043.

*To all whom it may concern:*

Be it known that I, WILLIAM E. SHERWOOD, a citizen of the United States, residing at Canastota, in the county of Madison and State of New York, have invented certain new and useful Improvements in Washing Apparatus for Milking-Machine Parts, of which the following is a specification.

The present invention relates more particularly to apparatus for washing the parts of milking machines, and the object is to provide a relatively simple mechanism that is comparatively inexpensive so as to be within the reach of the ordinary farmer, and by means of which certain essential parts of a milking machine can be effectively cleansed.

One embodiment of the invention is illustrated in the accompanying drawings, wherein:—

Figure 1 is a rear elevation of the apparatus,

Figure 2 is a front elevation of the same,

Figure 3 is a vertical sectional view,

Figure 4 is a top plan view,

In the embodiment disclosed, a liquid tank or container 7 is employed supported in a suitable frame 8 and preferably constructed of sheet metal. It has an open top, a bottom 9 that inclines downwardly in one direction, and a valved drain 10 communicating with its lowermost portion.

Figure 6:
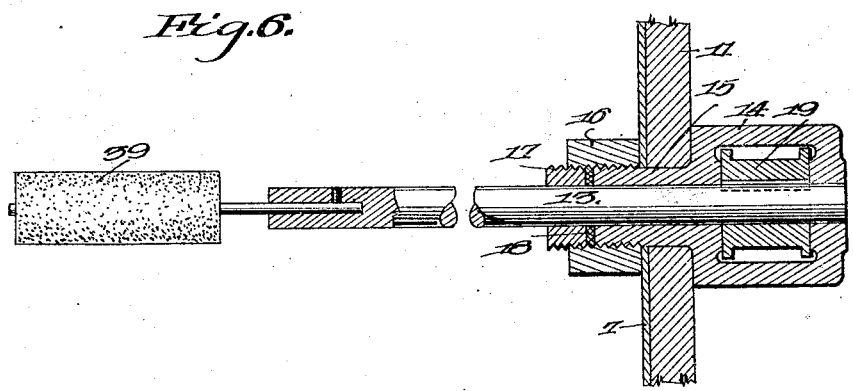
Figure 6 is a detail sectional view through one of the shaft mountings.

Journaled in the rear side wall 11 of the tank or container is a plurality of horizontally disposed shafts 12 and 13, these shafts being preferably of different lengths and extending in parallel relation toward the front side of the tank or container 7. Each shaft is provided with a liquid-tight bearing, and this bearing is shown in detail in Figure 6. A head yoke 14, located outside the container, is provided with a bushing 15 extending through the rear wall 11, and having its inner end threaded. A holding nut 16, screwed upon said inner end, abuts against the inner side of the wall 11, and thus clamps the head and bushing in place. The nut, it will be observed, projects beyond the inner end of the bushing, and threaded into the said projecting end, is a plug 17 between which and the inner end of the bushing is interposed packing 18. The shaft extends through the bushing and plug, and said plug 17, nut 16 and packing 18 provide a packing gland.

Figure 5:
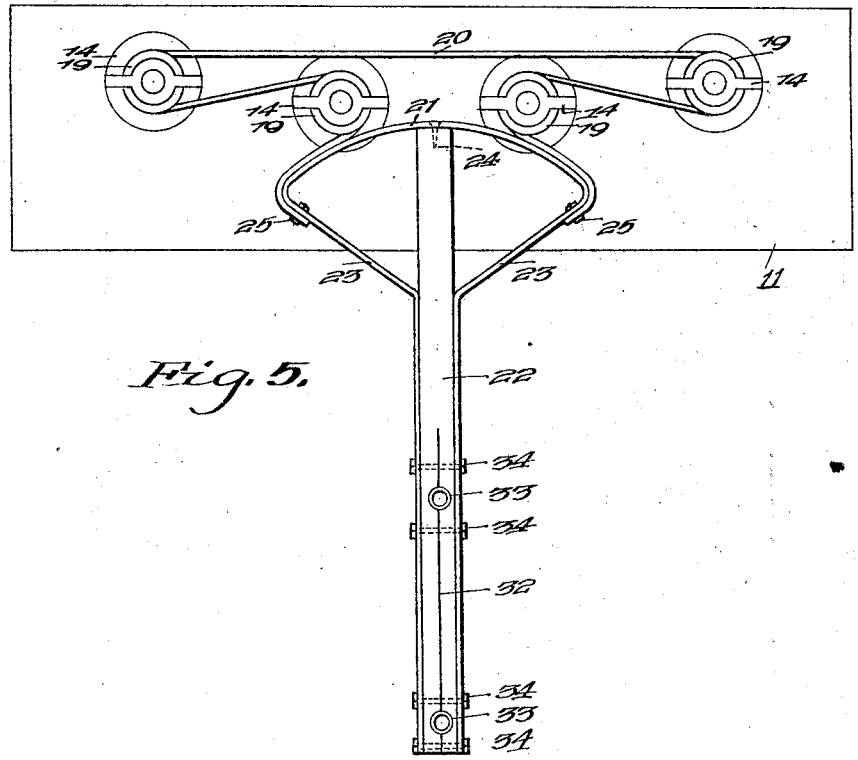
Figure 5 is a detail view in elevation of the operating mechanism.

The outer ends of the shafts have suitably secured thereto pulleys 19 located within the yokes 14, and passing around said pulleys is a transmission belt 20, the ends of which are fixed to the ends of a curved belt track 21. This track is mounted on the upper end of a lever 22, and is preferably formed of sheet metal having side arm braces 23 that extend to opposite sides of the lever and longitudinally along said opposite sides. The upper end of the lever extends to the central portion of the track 21, and is secured thereto as illustrated at 24, thus forming a support. The fasteners for the ends of the belt are illustrated at 25, and may be of any suitable character. By reference to Fig. 5, it will be noted that the two intermediate shafts and pulleys are located at a lower level than the end pulleys and that the belt passes on the inner sides of the intermediate pulleys, then over the same and around the outer sides and over the outer pulleys. The lever 22 is fulcrumed at 26, to the frame, and pivotally connected to the lower end of said lever at 27 is a pitman 28 connected to the crank 29 of a drive shaft 30. This drive shaft is mounted on the frame and is provided with a suitable pulley 31, by which motion from any suitable source can be imparted thereto.

In the construction shown the lever 22 has its lower portion longitudinally split, as shown at 32, and is provided with bushings 33 for the fulcrum 26 and pivot 27, bolts 34 being located on opposite sides of said bushings in order to clamp the parts securely together.

In certain milking machines there is employed a relatively long flexible tube through which the milk passes, and which must therefore be thoroughly cleansed in order to be sanitary. Means are therefore provided for cleaning such tubes. This means consists of a relatively long shaft or spindle 35 detachably fixed in any suitable manner to the shaft 12, and carrying a brush or scraper 36 which is located in or adjacent to the inner end of a guide tube 37 fixed to the front side of the container and having an upturned inlet end 38. The other shafts 13 are provided with suitable detachable brushes 39 which may be of various sizes as desired, to enter the different instrumentalities and openings or pockets of the parts.

When power is delivered to the pulley 31, it will be evident that the lever will be given a rocking motion and the belt 20 thereby drawn back and forth over the pulleys 19, imparting rotary motion to the shafts 12 and 13 alternately in opposite directions. The shafts and brushes are located below the normal liquid level, so that in actual operation they are submerged. The operator standing at the front of the machine can therefore place the different parts upon these rotary brushes, and they are cleaned below the liquid level. The flexible pipe is inserted through the guide tube 38, and is passed over the brush or scraper 36 as far as it will go. It can then be reversed and the other end passed over in like manner, thereby cleaning the pipe throughout its length. The rear side of the container is preferably provided with an upstanding apron 40 which prevents splashing of the liquid over and upon the driving mechanism.

The alternate reverse rotation of the brushes by the mechanism disclosed is also of great importance for the reason that as these brushes operate below the level of the liquid it causes an excessive agitation. This is due to the fact that when the brushes rotate in one direction, the liquid is caused to rotate with them. The sudden stop and reverse rotation of the brushes is against the rotary current thus produced, thereby breaking up such current and causing great disturbance thereto.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent is:—

1. A washing machine for milking apparatus parts and the like, comprising a liquid container having side walls, a shaft that extends through one of the side walls, a cleaning element on the shaft within the container, a driving means connected to the outer end of the shaft, and a bearing element for the shaft comprising a bushing surrounding the shaft and passing through the side wall, and a holding device for the bushing on the inner end of the same abutting against the side wall and forming a packing gland for the shaft.

2. A washing machine for milking apparatus parts and the like, comprising a liquid container having side walls, a shaft that extends through one of the side walls, a cleaning element on the shaft within the container, a driving means connected to the outer end of the shaft, and a bearing element for the shaft comprising a bushing surrounding the shaft and passing through the side wall, said bushing having its inner end threaded, a holding nut threaded on the inner end of the bushing and bearing against the side wall, a plug threaded into the nut and surrounding the shaft, and packing interposed between the plug and bushing.

3. A washing machine for milking apparatus parts and the like, comprising a liquid container having side walls, a shaft that extends through one of the side walls, a cleaning element on the shaft within the container, a bearing element for the shaft comprising a yoke head having a threaded bushing in which the shaft is journaled, said bushing extending through the side wall, a holding nut threaded in the inner end of the bushing and bearing against the side wall, a plug threaded into the nut and surrounding the shaft, packing interposed between the plug and bushing, and a pulley on the shaft and located within the yoke head.

4. In a washing machine for milking apparatus parts and the like, the combination with a liquid container, of a plurality of rotary cleaners located in the container and having shafts projecting from one side of the same, a common driving member located externally of said side, pulleys on the outer ends of the shafts, a rocking lever having a belt track thereon, and a belt secured to the lever operating on the track and engaged with the pulleys.

5. In a washing machine for milking apparatus parts and the like, the combination with a liquid container, of a plurality of rotary cleaners located in the container and having shafts projecting from one side of the same, a common driving member located externally of said side, pulleys on the outer ends of the shafts, a rocking lever having a curved belt track thereon, and a belt secured at its ends to the ends of the track, said belt operating on the track and engaged with the pulleys.

6. In a washing machine for milking apparatus parts and the like, the combination with a liquid container, of a rotary cleaning member located in the container and having a free end, and a tubular guide opening into the container in line with said free end of the cleaning member and having its inlet end above the liquid level of the container.

7. In a washing machine for milking apparatus parts and the like, the combination with a liquid container, of a rotary cleaning member located substantially horizontally in the container and having a free end disposed adjacent to one of the side walls, and a tubular guide opening through said side wall into the container in line with said free end of the cleaning member and having its inlet end upturned above the liquid level of the container.

In testimony whereof, I affix my signature.

WILLIAM E. SHERWOOD.